United States Patent
Dekker

(10) Patent No.: US 9,077,854 B2
(45) Date of Patent: Jul. 7, 2015

(54) PREVENTING THE USE OF MODIFIED RECEIVER FIRMWARE IN RECEIVERS OF A CONDITIONAL ACCESS SYSTEM

(75) Inventor: Gerard Johan Dekker, Nieuw-Vennep (NL)

(73) Assignee: Irdeto B.V., Hoofddorp (NL)

( * ) Notice: Subject to any disclaimer, the term of this patent is extended or adjusted under 35 U.S.C. 154(b) by 283 days.

(21) Appl. No.: 13/019,677

(22) Filed: Feb. 2, 2011

(65) Prior Publication Data

US 2011/0191589 A1 Aug. 4, 2011

(30) Foreign Application Priority Data

Feb. 3, 2010 (EP) .................................... 10152534

(51) Int. Cl.
| | |
|---|---|
| *G06F 21/00* | (2013.01) |
| *H04L 29/06* | (2006.01) |
| *H04N 7/16* | (2011.01) |
| *G06F 21/10* | (2013.01) |
| *H04N 21/258* | (2011.01) |
| *H04N 21/266* | (2011.01) |
| *H04N 21/418* | (2011.01) |

(Continued)

(52) U.S. Cl.
CPC ............... *H04N 7/163* (2013.01); *G06F 21/10* (2013.01); *H04N 21/25808* (2013.01); *H04N 21/26606* (2013.01); *H04N 21/4181* (2013.01); *H04N 21/4367* (2013.01); *H04N 21/4623* (2013.01); *H04N 21/8166* (2013.01)

(58) Field of Classification Search
CPC ............ H04N 7/163; H04N 21/25808; H04N 21/26606; H04N 21/4181; H04N 21/4367; H04N 21/4623; H04N 21/8166; G06F 21/10

USPC .......... 713/172, 165; 380/241, 277, 212, 239; 726/19

See application file for complete search history.

(56) References Cited

U.S. PATENT DOCUMENTS 7,848,521 B2 * 12/2010 Leporini et al. ............... 380/241
2004/0064706 A1   4/2004 Lin et al.
(Continued)

FOREIGN PATENT DOCUMENTS

| CN | 1526237 A | 9/2004 |
|---|---|---|
| WO | WO-98/15086 | 4/1998 |
| WO | WO 2006112581 A1 * | 10/2006 |

OTHER PUBLICATIONS

Song, W.J.; Won Hee Kim; Bo Gwan Kim; Minho Kang; Munkee Choi; "Contents protection system using smart card interface for digital CATV network based on the OpenCable specification"; Consumer Electronics, IEEE Transactions on vol. 49; Issue: 3 DOI: 10.1109/TCE.2003.1233806; Publication Year: Jun. 2003; pp. 693-702.*

(Continued)

*Primary Examiner* — Andrew Nalven
*Assistant Examiner* — Courtney Fields
(74) *Attorney, Agent, or Firm* — Marc S. Kaufman; Amardeep S. Grewal; Reed Smith LLP

(57) ABSTRACT

The invention enables the shared secret, which is used for encrypting the communication of CWs from a smartcard to a receiver, to cover at least a part of a binary image of firmware that is executing in the receiver. Preferably the shared secret covers the entire binary image of the firmware. Hereto, data from one or more predefined firmware memory locations are read, the set of data forming the shared secret.

22 Claims, 6 Drawing Sheets

(51) Int. Cl.
*H04N 21/4367* (2011.01)
*H04N 21/4623* (2011.01)
*H04N 21/81* (2011.01)
*H04L 9/32* (2006.01)
*H04N 7/167* (2011.01)

(56) References Cited

U.S. PATENT DOCUMENTS

2004/0083364 A1* 4/2004 Andreaux et al. ............ 713/165
2009/0028327 A1* 1/2009 Pinder ........................... 380/212
2009/0222910 A1* 9/2009 Le Bihan et al. .............. 726/19

OTHER PUBLICATIONS

"European Application No. 10152534.3, European Search Report dated Jul. 12, 2010", 6 pgs.

"Functional Model of a Conditional Access System", EBU Review Technical (1995) Winter, No. 266, XP 000559450, Brussels, BE, (Dec. 21, 1995), 64-77.

First Office Action cited in corresponding Chinese Application No. 201110071697.8 dated Jul. 30, 2014.

* cited by examiner

PREVENTING THE USE OF MODIFIED RECEIVER FIRMWARE IN RECEIVERS OF A CONDITIONAL ACCESS SYSTEM

CLAIM OF PRIORITY

The present patent application claims the benefit of priority under 35 U.S.C. §119 to European Patent Application No. 10152534.3, filed Feb. 3, 2010, the entire contents of which is incorporated herein by reference.

FIELD OF THE INVENTION

The present invention generally relates to securely obtaining control words for descrambling scrambled content in receivers of a conditional access system. More specifically, the invention relates to preventing the use of modified receiver firmware to obtain cleartext control words.

BACKGROUND

Broadcast networks for pay-tv applications deliver encrypted content to receivers and keys (also known as control words or CWs) associated to the encrypted content to secure devices. A secure device delivers CWs uniquely encrypted to a receiver enabling decryption (also known as descrambling) of the content in the receiver. Examples of a secure device are a smartcard and an obfuscated software client.

The communication channel between the secure device and the receiver is typically secured by encrypting communication with a temporary session key. A shared secret between the secure device and the receiver is used to negotiate the temporary session key. If an attacker obtains the shared secret, it can be used to intercept CWs on the communication channel and redistribute the CWs to other receivers for unauthorized descrambling of the content.

The shared secret is typically stored in a firmware of the receiver. In order to prevent an attacker from obtaining the shared secret, information hiding techniques can be used. Code obfuscation and data transformation are known techniques to make it difficult for an attacker to obtain the shared secret from the receiver firmware.

Attacks to the receiver infrastructure often take the form of placing a modified firmware in a pirate receiver and setting up a secured session with a smartcard using the modified firmware. The shared secret is exploited in the modified firmware to obtain cleartext CWs from the secure session. These cleartext CWs are shared with other receivers also running modified firmware, most of which do not have a smartcard with a valid subscription.

SUMMARY OF THE INVENTION

It is an object of the invention to prevent the use of modified firmware to obtain cleartext CWs.

According to an aspect of the invention a receiver is proposed. The receiver comprises a descrambler that is configured to descramble scrambled content using a control word to obtain descrambled content. The receiver further comprises a decrypter configured to decrypt an encrypted control word using a response to obtain the control word. The receiver further comprises a firmware memory. The receiver further comprises a probe module configured to receive a challenge indicative of one or more locations in the firmware memory. The probe module is further configured to read data from the one or more locations in the firmware memory. The data read from the firmware memory forms the response.

According to an aspect of the invention a method for use in a receiver is proposed. The method comprises the step of descrambling scrambled content using a control word to obtain descrambled content. The method further comprises the step of decrypting an encrypted control word using a response to obtain the control word. The method further comprises the step of receiving a challenge indicative of one or more locations in a firmware memory of the receiver. The method further comprises the step of reading data from the one or more locations in the firmware memory. The data forms the response.

Advantageously, the use of modified firmware to obtain control words is thus prevented. When the firmware is modified, e.g. for use in pirate devices, the shared secret, i.e. the data forming the response and which is used as a crypto key, alters into an incorrect shared secret. As a result the encrypted control word cannot be decrypted. This makes it virtually impossible to use pirate devices with modified firmware to intercept control words and redistribute the control words to other receivers for unauthorized descrambling of content.

The embodiments of claims 2 and 13 advantageously enable chaining of responses.

According to an aspect of the invention a smartcard is proposed. The smartcard comprises a key memory configured to store a first key and a second key. The smartcard further comprises a first decrypter configured to decrypt one or more encrypted challenge response pairs using the second key from the key memory to obtain one or more decrypted challenge response pairs. The smartcard further comprises a memory configured to store the one or more challenge response pairs. The smartcard further comprises a second decrypter configured to decrypt an encrypted control word using the first key from the key memory to obtain a control word. The smartcard further comprises an encrypter configured to encrypt the control word using a response of one of the challenge response pairs stored in the memory to obtain a re-encrypted control word. The smartcard is configured to transmit the re-encrypted control word and a challenge of the one of the challenge response pairs to a receiver. The challenge is indicative of one or more locations in a firmware memory of the receiver. Data in the one or more locations in the firmware forms the response enabling the receiver to decrypt the encrypted control word.

According to an aspect of the invention a method is proposed for use in a smartcard. The method comprises the step of decrypting one or more encrypted challenge response pairs using a second key to obtain one or more decrypted challenge response pairs. The method further comprises the step of storing the one or more challenge response pairs in a memory. The method further comprises the step of decrypting an encrypted control word using a first key to obtain a control word. The method further comprises the step of encrypting the control word using a response of one of the challenge response pairs stored in the memory to obtain a re-encrypted control word. The method further comprises the step of transmitting the re-encrypted control word and a challenge of the one of the challenge response pairs to a receiver. The challenge is indicative of one or more locations in a firmware memory of the receiver. Data in the one or more locations in the firmware forms the response enabling the receiver to decrypt the encrypted control word.

According to an aspect of the invention a smartcard is proposed, which is an alternative to the above mentioned smartcard. The smartcard comprises a key memory configured to store a key. The smartcard further comprises a decrypter configured to decrypt an encrypted control word, an encrypted challenge and two or more encrypted responses using the key from the key memory to obtain a control word, a challenge and two or more responses, respectively. Each response forms a challenge response pair with the challenge for a particular receiver. The smartcard further comprises an encrypter configured to encrypt the control word using a response of one of the challenge response pairs to obtain a re-encrypted control word. The smartcard is configured to transmit the re-encrypted control word and the challenge of the one of the challenge response pairs to a receiver. The challenge is indicative of one or more locations in a firmware memory of the receiver. Data in the one or more locations in the firmware forms the response enabling the receiver to decrypt the encrypted control word.

According to an aspect of the invention a method is proposed for use in a smartcard, which method is an alternative to the above mentioned method. The method comprises the step of decrypting an encrypted control word, an encrypted challenge and two or more encrypted responses using a key to obtain a control word, a challenge and two or more responses, respectively. Each response forms a challenge response pair with the challenge for a particular receiver. The method further comprises the step of encrypting the control word using a response of one of the challenge response pairs to obtain a re-encrypted control word. The method further comprises the step of transmitting the re-encrypted control word and the challenge of the one of the challenge response pairs to a receiver. The challenge is indicative of one or more locations in a firmware memory of the receiver. Data in the one or more locations in the firmware forms the response enabling the receiver to decrypt the encrypted control word.

Advantageously, the use of modified receiver firmware to obtain control words in a receiver is prevented by the smartcards of the invention. When the firmware is modified, e.g. for use in pirate devices, the shared secret, i.e. the data forming the response and which is used as a crypto key, does not match the shared secret used by the smartcard to encrypt the control word prior to transmitting the control word to the receiver. As a result the encrypted control word cannot be decrypted in the receiver in case the firmware is modified. This makes it substantially impossible to use pirate devices with modified firmware to intercept control words and redistribute the control words to other receivers for unauthorized descrambling of content.

The embodiment of claim 5 advantageously enables use or reuse of the challenge response pairs at a later moment in time.

The embodiment of claim 6 advantageously enables the smartcard to be paired with a particular receiver and store only the challenge response pairs for the particular receiver.

According to an aspect of the invention a head-end system is proposed. The head-end system comprises a memory configured to store a copy of a firmware memory of a receiver having one or more of the above mentioned features. The head-end system is configured to generate a challenge response pair. The challenge is indicative of one or more locations in the firmware memory. The response is formed by data read from the one or more locations in the firmware memory. The head-end system is further configured to encrypt the challenge response pair and transmit the encrypted challenge response pair to a smartcard having one or more of the above mentioned features.

As the copy of the firmware memory of the receiver that is stored in the head-end system is identical to an unmodified firmware memory in the receiver, the head-end system is capable of creating challenge response pairs for individual receivers.

Advantageously, the use of modified firmware to obtain control words in receivers is thus prevented. When the firmware is modified, e.g. for use in pirate devices, the shared secret, i.e. the data forming the response and which is used as a crypto key, alters into an incorrect shared secret. As a result encrypted control words, which are transmitted from a smartcard to a receiver and encrypted using the shared secret, cannot be decrypted in the receiver. This makes it substantially impossible to use pirate devices with modified firmware to intercept control words and redistribute the control words to other receivers for unauthorized descrambling of content.

The embodiment of claim 8 advantageously enables the use of known EMMs and ECMs for the distribution of challenge response pairs and control words.

The embodiment of claim 9 advantageously enables distribution of challenge response pairs and control words using known ECMs only.

According to an aspect of the invention a conditional access system is proposed. The conditional access system comprises a receiver having one or more of the above mentioned features. The receiver is communicatively directly, possibly detachably, connected to a smartcard having one or more of the above mentioned features. The conditional access system further comprises a further receiver that is communicatively connected to the receiver via a network. The further receiver uses the smartcard to obtain a control word for descrambling scrambled content in the further receiver.

Thus receivers without smartcards are enabled to descramble content in a networked configuration.

The embodiment of claim 11 advantageously enables receivers without smartcards to descramble content in a conditional access network.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

The invention enables the shared secret, which is used for encrypting the communication of CWs from a smartcard to a receiver, to cover at least a part of a binary image of firmware that is executed in the receiver. The shared secret may cover a part or the entire binary image of the firmware. Hereto, data from one or more predefined firmware memory locations are read, wherein the set of read data forms the shared secret. As a result, when the firmware is modified, e.g. for use in pirate devices, the shared secret is altered into an incorrect shared secret. This makes it virtually impossible to use pirate devices with modified firmware to intercept CWs on the communication channel and redistribute the CWs to other receivers for unauthorized descrambling of content.

Data indicating the predefined firmware memory locations is hereafter referred to as a challenge C and a set of data read from the predefined firmware memory locations in response to a received challenge C and forming the secret data is hereafter referred to as a response R.

Figure 1:
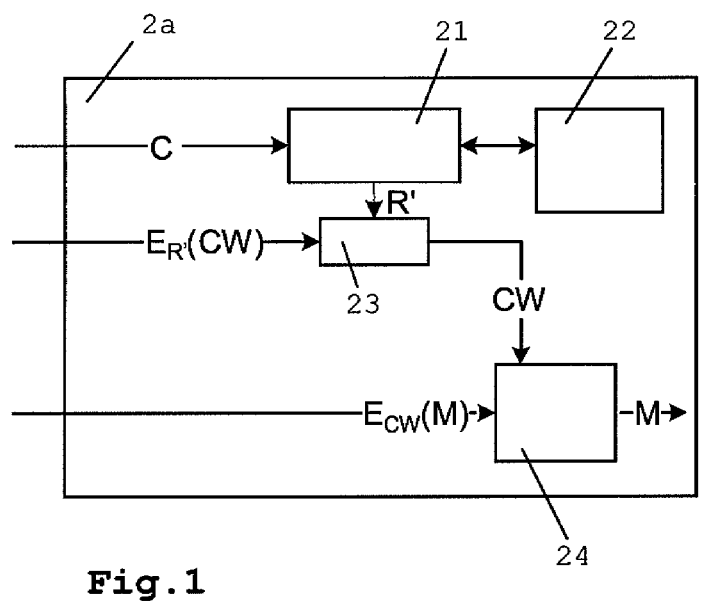
FIG. 1 shows a receiver of an exemplary embodiment of the invention.

In FIG. 1 a receiver $2a$ is shown of an exemplary embodiment of the invention. A CW for descrambling a content M is input to the receiver $2a$ in encrypted form $E_R(CW)$, i.e. encrypted with a response R'. Also, a challenge C is input to the receiver $2a$. Challenge C is used by a probe module 21 to read data from a firmware memory 22 at memory locations predefined by challenge C. The set of data thus read from the firmware memory 22 forms the response R'. The response R' is provided to a decrypter 23, where it is used to decrypt $E_R(CW)$ and obtain the CW. The thus obtained CW is provided to descrambler 24, where it is used to descramble scrambled content $E_{CW}(M)$ and obtain the content M.

Figure 2:
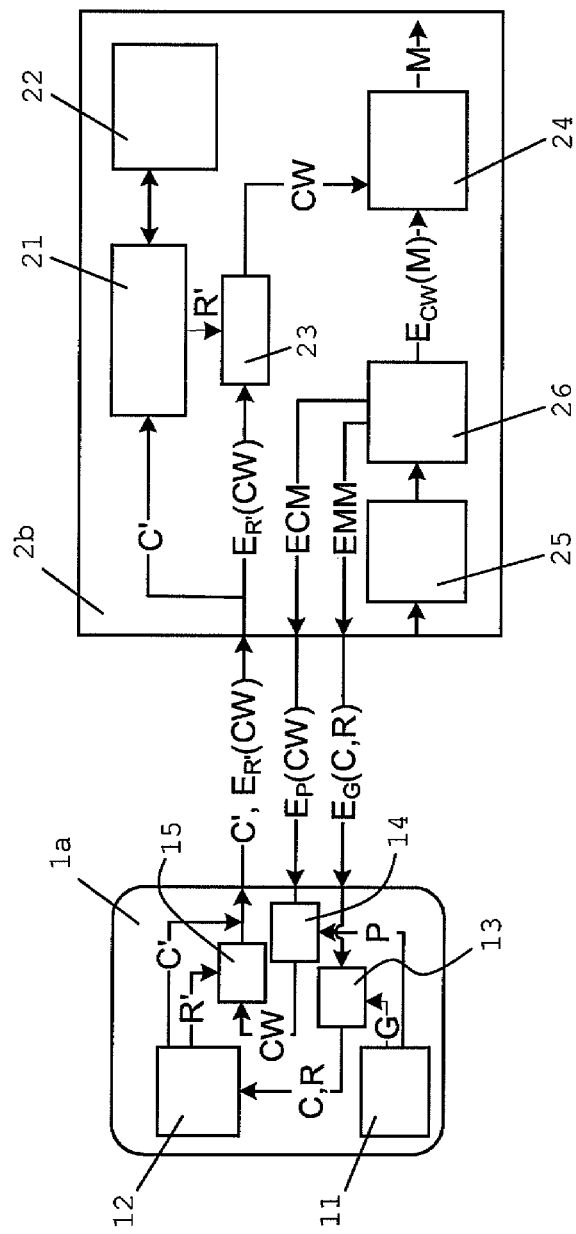
FIG. 2 shows a descrambling module according to an exemplary embodiment of the invention.

FIG. 2 shows an descrambling module according to one embodiment of the invention, comprising a receiver $2b$ which is communicatively connected to a smartcard $1a$. A tuner/demodulator module 25 of the receiver $2b$ receives a broadcast stream containing scrambled content $E_{CW}(M)$, entitlement control messages (ECMs) and entitlement management messages (EMMs) in a manner known per se. Demultiplexer 26 extracts the EMMs and ECMs from the broadcast stream, typically according to criteria defined by the smartcard $1a$. The ECMs and EMMs are transmitted to the smartcard $1a$ for processing.

The ECMs and EMMs are typically received in the receiver $2b$ from a head-end system (not shown). The head-end system has an image of the firmware memory 22 of the receiver $2b$. Preferably the head-end system has a database with all firmware memory images of all deployed receivers in the field.

For the firmware memory image, the head-end system creates one or more challenges C by selecting a number of memory locations in the firmware memory image. In one embodiment, the memory locations are selected randomly. In a further embodiment, non-random selection criteria may be used, for example by selecting a challenge that produces a different response in legitimate firmware then in the pirate firmware. An example of such challenge may be the address of a memory location in the firmware memory image with the response being the value stored in that memory location.

EMMs transmitted by the head-end system in the broadcast stream contain one or more challenge-response pairs C,R, each pair comprising a challenge C and its associated response R. These pairs may be transmitted in the form of a table of challenge C response R pairs, possibly for all deployed firmware memory images. This table is encrypted and authenticated under keys used between the head-end system and smartcards. In the example of FIG. 2 the EMM contains a challenge-response table "C,R" which may be encrypted using a key G, i.e. $E_G(C,R)$. The "C,R" table may contain multiple challenge-response pairs for a type of receiver. An EMM typically contains a "C,R" table for each receiver in the infrastructure. The number of pairs for each receiver may vary, e.g. the table for a popular receiver may have a different number of entries than a less popular receiver model.

The "C,R" tables are typically broadcast to all smartcards. It is assumed that an attacker cannot get access to these "C,R" tables as they are transmitted in EMMs, which are protected under known strong security mechanisms between the head-end system and the smartcard.

The head-end system may regularly distribute new "C,R" tables to the smartcards.

Upon insertion in the receiver $2b$, the smartcard $1a$ may optionally query the model and version number, or any other identification data, of the receiver $2b$. Alternatively, the head-end system may enforce a coupling of a particular smartcard to a particular receiver using, for example, the model and version and/or one or more other identifiers.

The smartcard $1a$ reads a key G from key memory 11 and uses the key G (which may have been obtained in a previously received EMM) to obtain the "C,R" table from the EMM in decrypter 13. Subsequently, the "C,R" table is stored in memory 12. In one variant, only "C,R" table elements associated with the model and/or version number of the receiver are stored in the memory 12.

The smartcard $1a$ reads a key P from the key memory 11 and uses the key P (which may have been obtained in a previously received EMM) to obtain the CW from the ECM in decrypter 14.

To securely communicate the CW to the receiver $2b$, the smartcard $1a$ retrieves a single challenge C' and corresponding response R' from the "C,R" table stored in the memory 12 and uses the response R' to encrypt the control word CW in encrypter 15. The encrypted CW $E_R(CW)$ is transmitted to the receiver $1b$ along with the challenge C'. The challenge C' may be in cleartext.

The smartcard $1a$ may select any challenge-response pair from the memory 12, e.g. randomly. The selection of a challenge-response pair may be controlled from the head-end system through an instruction provided in the ECM or EMM.

A probe module 21 in the receiver $2b$ uses the challenge C' to read one or more values from the firmware memory image 22 to generate an output response R', which is used to decrypt the encrypted CW $E_R(CW)$ in decrypter 23. The thus obtained CW value is subsequently loaded into descrambler module 24 of the receiver $2b$ to descramble scrambled content $E_{CW}(M)$ and obtain the content M.

Figure 3:
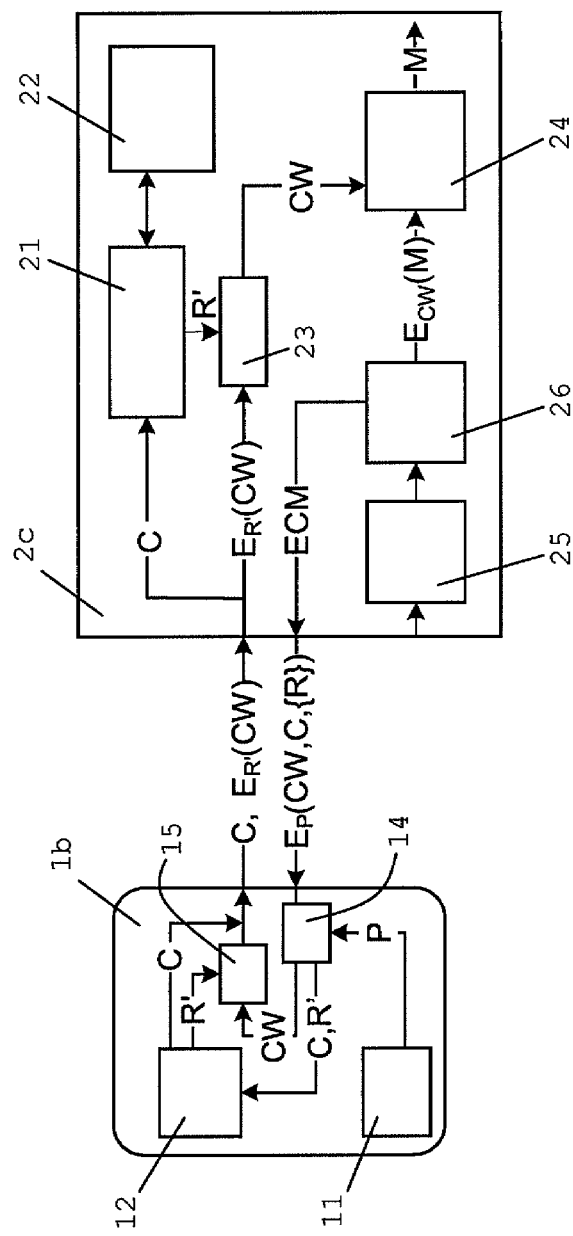
FIG. 3 shows descrambling module according to another exemplary embodiment of the invention.

FIG. 3 depicts a descrambling module according to one further embodiment of the invention, comprising a receiver $2c$ which is communicatively connected to a smartcard $1b$. The functioning of the receiver $2c$ and smartcard $1b$ of FIG. 3 is similar to the functioning of the receiver $2b$ and smartcard $1a$ of FIG. 2. The embodiment in FIG. 3 differs from the one depicted in FIG. 2 in that it does not use a "C,R" table in an EMM. Instead, the ECM that comprises the control word CW also comprises a single challenge C and an associated set of responses {R} for multiple receivers. This method ensures that the required challenge-response pair is available in the smartcard $2b$ when processing the ECM and returning the encrypted CW $E_R(CW)$ to the receiver $2c$.

The receiver $2c$ sends the ECM containing the CW, the challenge C and a set {R} with responses for multiple receivers to the smartcard. In response, the smartcard $1b$ decrypts the ECM in decrypter 14 using key P from key memory 11 and selects the appropriate R' from the set {R} corresponding with the challenge C. The smartcard may use the thus selected challenge-response pair to encrypt the control word CW in encrypter 15 with the response R' and to return the encrypted CW $E_R(CW)$ together with the challenge C to the receiver $2b$.

In one embodiment, the challenge-response pair may be stored in the memory 12 for use in the processing of later ECMs and CWs.

In a further embodiment, subsequently used responses R' may be chained in order to prevent a receiver from recovering from a wrong calculation of a response R'. Hereto, the probe module 21 uses the data forming one or more previously obtained responses R' and the current challenge to generate a new response.

Figure 4:
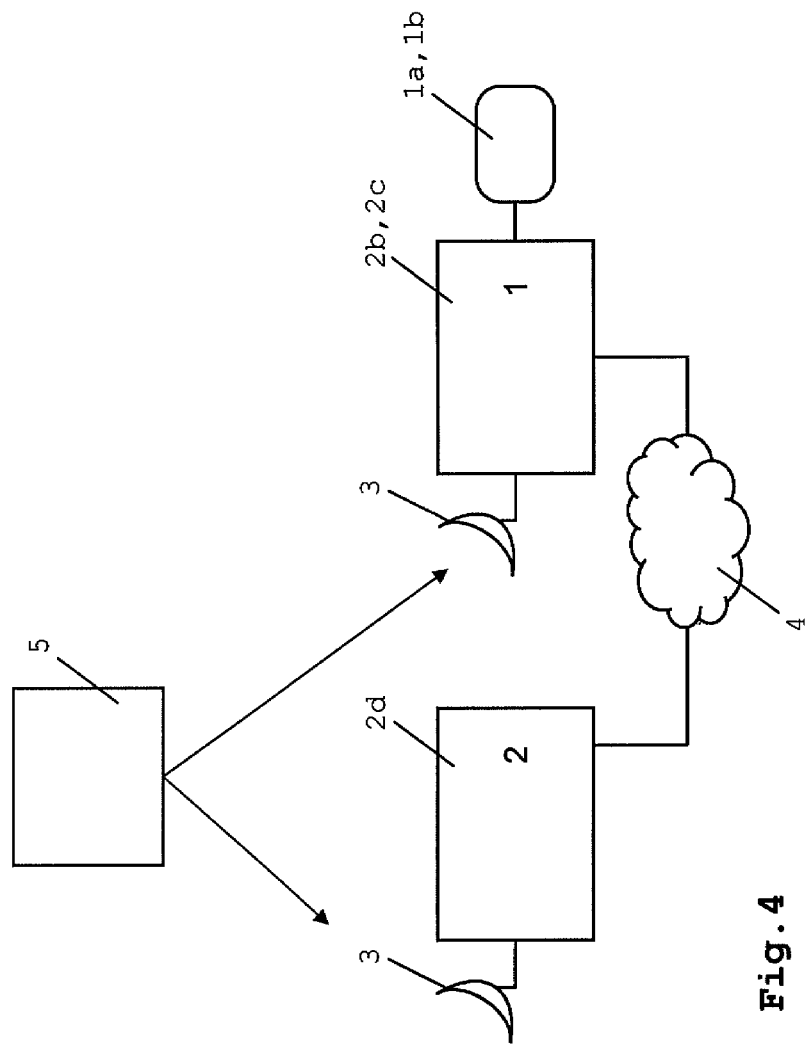
FIG. 4 shows a conditional access network of an exemplary embodiment of the invention.

FIG. 4 shows a smartcard 1a, 1b that may be shared between multiple receivers 2b,2c,2d in a home network 4. The receivers 2b,2c,2d are each connected to the home network 4 and each have their own connection to a head-end system 5 in a broadcast network via broadband connection 3. The broadcast network may use any known wireless or wire line technology. In the example of FIG. 4, only receivers 2b and 2c are communicatively directly connected to smartcards 1a and 1b, respectively. Receiver 2d is configured to use one of the smartcards 1a and 1b through the home network 4 and one of the receivers 2b and 2c. Hereto receiver 2d establishes a virtual connection to the smartcard 1a,1b.

In a first variant, the smartcard 1a in FIG. 4 may contain a "C,R" table for the firmware images of both receivers 2b and 2d. The smart card encrypts the CW with the response R' that the corresponding challenge C will generate in the target receiver 2b,2d. In a second variant, the smartcard 1a,1b only returns encrypted CWs that can be decrypted with a response R' obtained in the receiver 2b,2c it is connected to. Consequently, if e.g. receiver 2d receives a challenge C' that can only be used on the firmware memory of receiver 2b for the generation a correct response R', then receiver 2d will not be able to obtain the correct response R' and obtain CW from $E_R(CW)$.

Enabling the receiver 2d to obtain the CW, may be realized through different implementations. In a first implementation, receiver 2b,2c processes the encrypted CW as described with FIG. 2 or FIG. 3. Subsequently the obtained CW is transmitted to receiver 2d via the home network 4, preferably over a secure session between the receivers. In a second implementation, receiver 2b,2c uses its probe module 21 to obtain the response R'. Subsequently the response R' and encrypted CW $E_R(CW)$ are transmitted to receiver 2d via the home network, preferably over a secure session between the receivers.

To prevent misuse of access to a smartcard 1a,1b, the smartcard 1a,1b may comprise a security mechanism using a challenge and response to prove the identity of the receiver 2b,2c that the smartcard 1a,1b is connected to.

In order to establish the identity—whereby it is ascertained that the receiver firmware memory image is unmodified—the smartcard 1a,1b regularly sends a challenge C,C' to the receiver 2b,2c and expects the corresponding response R' in return.

To prevent a pirate device querying a database for the correct response R', the response preferably needs to be returned to the smartcard 1a,1b within a predetermined time frame. The head-end may configure a time frame for each receiver or for each receiver model and send in an EMM to the smartcard 1a,1b. If the response R' is not received within the predetermined time frame, the smartcard 1a,1b refuses to further communicate encrypted CWs $E_R(CW)$ to the receiver 2b,2c. The time frame can be chosen such that it becomes impossible or at least very difficult to use the smartcard 1a,1b with a receiver that is communicatively connected to the smartcard 1a,1b via a network. The time delays caused by the network then result in the receiver conveying the response R' too late.

Optionally, the smartcard 1a,1b transmits a nonce together with the challenge to the receiver. The receiver uses the challenge to generate a response R' using probe module 21 and then encrypts the nonce with the response value R' used as key. The encryption typically uses a strong encryption algorithm, e.g. AES. The resulting encrypted nonce is then sent back to the smartcard 1a,1b. The smartcard 1a,1b has also encrypted the nonce it had sent to the receiver with the response value R' from its memory 12 and compares this result with the nonce value it got back from the receiver. If they match and the value was received within the predetermined time frame, the challenge response action is regarded as successful and the smartcard 1a,1b will continue its control word communication channel with the receiver. If not, the smartcard 1a,1b will stop communicating control words to the receiver.

The smartcard 1a,1b is typically implemented having a traditional form factor. Any other computing device implementing smartcard technology may be used as a smartcard instead, such as e.g. a PC running smartcard emulation software.

Figure 5:
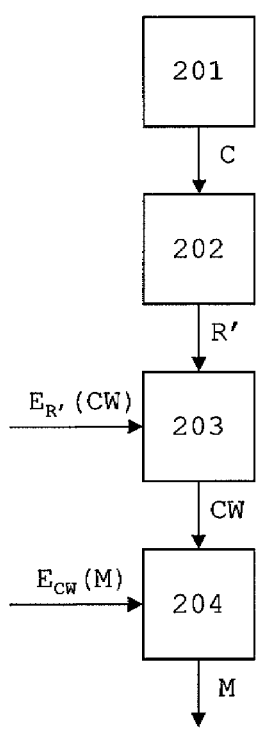
FIG. 5 shows a method for use in a receiver according to one embodiment of the invention.

FIG. 5 depicts a method that may be performed by a receiver 2a, 2b or 2c in a descrambling module as described with reference to FIG. 1, FIG. 2 and FIG. 3, respectively. In step 201 a challenge C is received. The challenge C indicates the memory locations in the firmware memory of the receiver that are to be read. In step 202 the data is read from indicated memory locations. The data forms the response R'. In step 203 the encrypted CW $E_R(CW)$ is decrypted using the response R'. In step 204 scrambled content $E_{CW}(M)$ is descrambled using the CW. Thus, descrambled content M is obtained.

Figure 6:
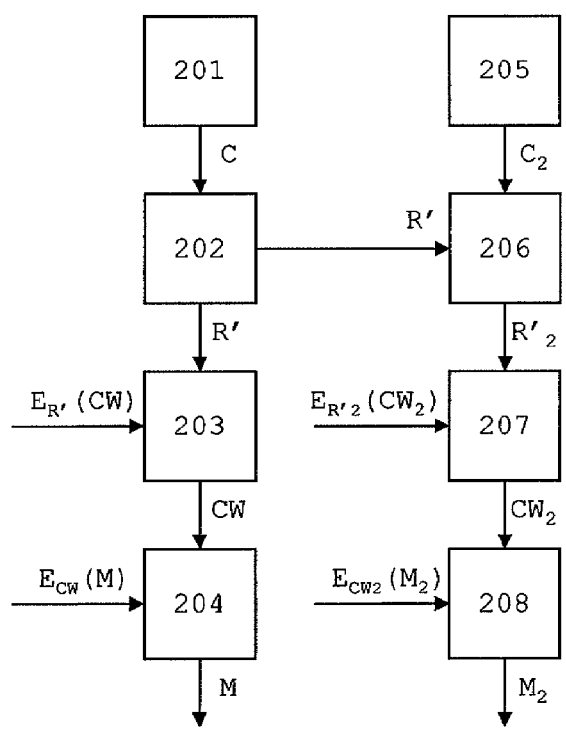
FIG. 6 shows a method for use in a receiver according to another embodiment of the invention.

FIG. 6 shows an extension of the method shown in FIG. 5. In step 205 a further challenge $C_2$ is received. In step 206 a further response $R'_2$ is calculated using the response R' from step 202 and the further challenge $C_2$. In step 207 a further encrypted CW $E_{R2}(CW_2)$ is decrypted using the further response $R'_2$ to obtain a further control word $CW_2$. In step 208 further scrambled content $E_{CW2}(M_2)$ is descrambled using the further control word $CW_2$. Thus, further descrambled content $M_2$ is obtained.

Figure 7:
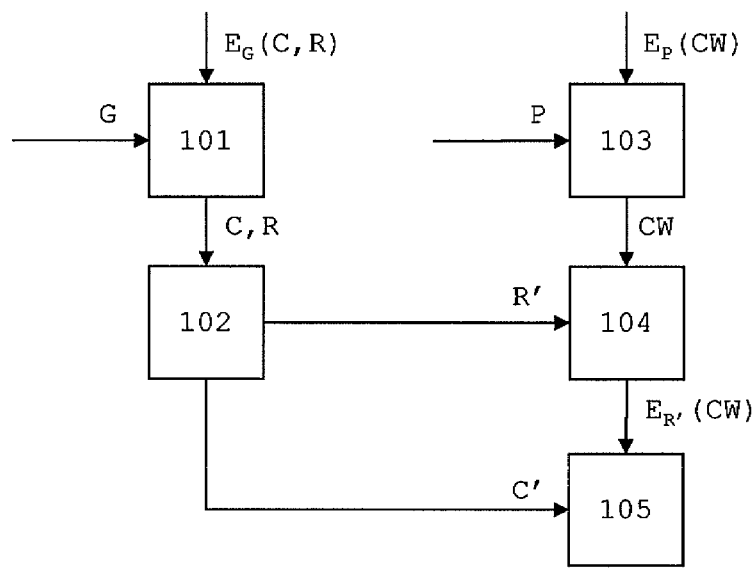
FIG. 7 shows steps of a method for use in a smartcard according to one embodiment of the invention.

FIG. 7 depicts a method that may be performed by a smartcard 1a as described with reference to FIG. 2. In step 101 one or more encrypted challenge-response pairs $E_G(C,R)$ are decrypted using a key G. Key G has typically been received in an EMM. In step 102 the challenge-response pairs C,R are stored in a memory. In step 103 an encrypted control word $E_P(CW)$ is decrypted using a key P. Key P has typically been received in an EMM. In step 104 the CW is encrypted using a response R', which is one of the responses R stored in the memory. Thus, a re-encrypted control word $E_R(CW)$ is obtained. In step 105 the re-encrypted control word $E_R(CW)$ and a challenge C' are transmitted to a receiver. The challenge C' is one of the challenges C stored in the memory and form a pair with the response R'. The challenge C' is indicative of memory locations in a firmware memory of the receiver. In the receiver, the data read from the firmware memory at the indicated locations forms the response R' enabling the receiver to decrypt the encrypted control word $E_R(CW)$.

Figure 8:
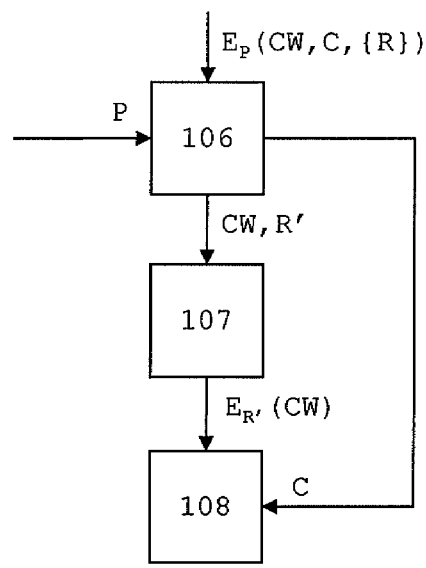
FIG. 8 shows a method for use in a smartcard according to a further embodiment of the invention.

FIG. 8 depicts a method that may be performed by the smartcard 1b in the descrambling module as described with reference to FIG. 3. In step 106 an encrypted control word $E_P(CW)$, an encrypted challenge $E_P(C)$ and two or more encrypted responses $E_P(\{R\})$ are decrypted using a key P. Thus to the control word CW, the challenge C and two or more responses $\{R\}$ are obtained. Key P has typically been received in an EMM. Each response R' in the set of responses $\{R\}$ forms a challenge-response pair C,R' with the challenge C. The challenge-response pair C,R' works for a particular receiver, so when reading the memory location as indicated by challenge C from the firmware image of the particular receiver, the response R' is obtained. In step 107 the CW is encrypted using the response R' of one of the challenge-response pairs C,R' thereby obtaining a re-encrypted control word $E_R(CW)$. In step 108 the re-encrypted control word $E_R(CW)$ and the challenge C are transmitted to the receiver. The challenge C forms a pair with the response R'. The challenge C is indicative of memory locations in a firmware memory of the receiver. In the receiver, the data read from the firmware memory at the indicated locations forms the response R' enabling the receiver to decrypt the encrypted control word $E_R(CW)$.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Moreover, the invention is not limited to the embodiments described above, which may be varied within the scope of the accompanying claims.

What is claimed is:

1. A receiver comprising:
    a firmware memory;
    an input configured to receive a challenge and a control word encrypted using a first response that corresponds to the challenge, the challenge being indicative of one or more locations in the firmware memory;
    a data reading module configured to read data from the one or more locations in the firmware memory, the data forming a second response to the challenge;
    a decrypter configured to decrypt the encrypted control word using the second response to the challenge as a key, to obtain a first control word for descrambling first scrambled content; and
    a descrambler configured to descramble the first scrambled content using the first control word to obtain first descrambled content.

2. The receiver according to claim 1, wherein the input is further configured to receive a further challenge and the receiver is configured to calculate a response to the further challenge using the second response and the further challenge.

3. A smartcard comprising:
    a key memory configured to store a first key and a second key;
    a first decrypter configured to decrypt one or more encrypted challenge-response pairs using the second key from the key memory to obtain one or more decrypted challenge-response pairs, each of the one or more challenge-response pairs including a challenge and a response to the challenge;
    a memory configured to store the one or more challenge-response pairs;
    a second decrypter configured to decrypt an encrypted control word using the first key from the key memory to obtain a control word for descrambling content;
    an encrypter configured to encrypt the control word by selecting and using a first response of one of the challenge-response pairs stored in the memory to obtain a re-encrypted control word,
    wherein the smartcard is configured to transmit the re-encrypted control word and the challenge of the one of the challenge-response pairs to a receiver,
    and wherein the challenge of the one of the challenge-response pairs is indicative of one or more locations in a firmware memory of the receiver, data in the one or more locations in the firmware memory of the receiver forming a key for use by the receiver to decrypt the re-encrypted control word.

4. A smartcard comprising:
    a key memory configured to store a key;
    a decrypter configured to decrypt an encrypted control word, an encrypted challenge and two or more encrypted responses using the key from the key memory to obtain a control word, a challenge and two or more responses to the challenge, respectively, wherein each response forms a challenge-response pair with the challenge for a particular receiver;
    an encrypter configured to encrypt the control word by selecting and using a first response of one of the challenge-response pairs to obtain a re-encrypted control word, wherein the smartcard is configured to transmit the re-encrypted control word and the challenge of the one of the challenge-response pairs to a receiver, and
    wherein the challenge of the one of the challenge-response pairs is indicative of one or more locations in a firmware memory of the receiver, data in the one or more locations in the firmware memory of the receiver forming a key for use by the receiver to decrypt the re-encrypted control word.

5. The smartcard according to claim 4, further comprising a memory configured to store one or more of the challenge-response pairs.

6. The smartcard according to claim 3, further configured to receive identification data from the receiver, wherein the response is linked to a particular identification data, and wherein the memory is configured to store only the challenge-response pairs for which the particular identification data matches the received identification data.

7. A head-end system comprising:
    a memory configured to store a copy of a firmware memory of a first receiver, wherein the first receiver comprises:
        the firmware memory;
        an input configured to receive a challenge and a control word encrypted using a first response that corresponds to the challenge, the challenge being indicative of one or more locations in the firmware memory;
        a data reading module configured to read data from the one or more locations in the firmware memory, the data forming a second response to the challenge;
        a decrypter configured to decrypt the encrypted control word using the second response to the challenge as a key, to obtain a first control word for descrambling first scrambled content; and
        a descrambler configured to descramble the first scrambled content using the first control word to obtain first descrambled content;

wherein the first receiver is configured to communicate with a smartcard that comprises:
- a key memory configured to store a first key and a second key;
- a first decrypter configured to decrypt one or more encrypted challenge-response pairs using the second key from the key memory to obtain one or more decrypted challenge-response pairs, each of the one or more challenge-response pairs including a challenge and a response to the challenge;
- a memory configured to store the one or more challenge-response pairs;
- a second decrypter configured to decrypt an encrypted control word using the first key from the key memory to obtain a control word for descrambling content; and
- an encrypter configured to encrypt the control word by selecting and using a first response of one of the challenge-response pairs stored in the memory to obtain a re-encrypted control word, wherein the smartcard is configured to transmit the re-encrypted control word and the challenge of the one of the challenge-response pairs to the first receiver;

wherein the head-end system is configured to:
- select one or more locations in the firmware memory of the receiver;
- generate a challenge-response pair comprising the challenge indicative of the one or more locations in the firmware memory and the first response; and
- encrypt the challenge-response pair and transmit the encrypted challenge-response pair to the smartcard.

8. The head-end system according to claim 7, wherein the encrypted challenge-response pair is transmitted in an entitlement management message and wherein the head-end system is configured to transmit an encrypted control word to the smartcard in an entitlement control message.

9. The head-end system according to claim 7, wherein the encrypted challenge-response pair is transmitted in an entitlement control message and wherein the entitlement control message further comprises an encrypted control word.

10. A conditional access system comprising a first receiver that is communicatively directly connected to a smartcard, wherein the first receiver comprises:
- a firmware memory;
- an input configured to receive a challenge and a control word encrypted using a first response that corresponds to the challenge, the challenge being indicative of one or more locations in the firmware memory;
- a data reading module configured to read data from the one or more locations in the firmware memory, the data forming a second response to the challenge;
- a decrypter configured to decrypt the encrypted control word using the second response to the challenge as a key, to obtain a first control word for descrambling first scrambled content; and
- a descrambler configured to descramble the first scrambled content using the first control word to obtain first descrambled content;

wherein the smartcard comprises:
- a key memory configured to store a first key and a second key;
- a first decrypter configured to decrypt one or more encrypted challenge-response pairs using the second key from the key memory to obtain one or more decrypted challenge-response pairs, each of the one or more challenge-response pairs including a challenge and a response to the challenge;
- a memory configured to store the one or more challenge-response pairs;
- a second decrypter configured to decrypt an encrypted control word using the first key from the key memory to obtain a control word for descrambling content; and
- an encrypter configured to encrypt the control word by selecting and using a first response of one of the challenge-response pairs stored in the memory to obtain a re-encrypted control word, wherein the smartcard is configured to transmit the re-encrypted control word and the challenge of the one of the challenge-response pairs to the first receiver;

wherein the conditional access system further comprises a further receiver that is communicatively connected to the first receiver via a network, wherein the further receiver uses the smartcard to obtain a control word for descrambling scrambled content in the further receiver.

11. The conditional access system according to claim 10, further comprising a head-end system, wherein the head-end system comprising a memory configured to store a copy of the firmware memory of the first receiver and wherein the head-end system is configured to:
- select one or more locations in the firmware memory of the first receiver;
- generate a challenge-response pair comprising the challenge indicative of the one or more locations in the firmware memory and the first response; and
- encrypt the challenge-response pair and transmit the encrypted challenge-response pair to the smartcard.

12. A method in a receiver comprising:
- receiving a challenge and a control word encrypted using a first response that corresponds to the challenge, the challenge indicative of one or more locations in a firmware memory of the receiver;
- reading data from the one or more locations in the firmware memory, the data forming a second response to the challenge;
- decrypting the encrypted control word using the second response to the challenge as a key, to obtain a first control word for descrambling first scrambled content; and
- descrambling the first scrambled content using the first control word to obtain first descrambled content.

13. The method according to claim 12, further comprising:
- receiving a further challenge;
- calculating a response to the further challenge using the second response and the further challenge.

14. A method in a smartcard comprising:
- decrypting one or more encrypted challenge-response pairs using a second key to obtain one or more decrypted challenge-response pairs, each of the one or more decrypted challenge-response pairs including a challenge and a response to the challenge;
- storing the one or more challenge-response pairs in a memory;
- decrypting an encrypted control word using a first key to obtain a control word for descrambling content;
- selecting a response of one of the challenge-response pairs stored in the memory and encrypting the control word using a first response of the one of the challenge-response pairs stored in the memory to obtain a re-encrypted control word; and
- transmitting the re-encrypted control word and the challenge of the one of the challenge-response pairs to a receiver, wherein the challenge of the one of the challenge-response pairs is indicative of one or more locations in a firmware memory of the receiver, data in the one or more locations in the firmware memory of the receiver forming a key for use by the receiver to decrypt the re-encrypted control word.

15. A method in a smartcard comprising:

decrypting an encrypted control word, an encrypted challenge and two or more encrypted responses using a key to obtain a control word, a challenge and two or more responses to the challenge, respectively, wherein each response forms a challenge-response pair with the challenge for a particular receiver;

selecting a response of one of the challenge response pairs stored in the memory and encrypting the control word using a first response of the one of the challenge-response pairs to obtain a re-encrypted control word; and transmitting the re-encrypted control word and the challenge of the one of the challenge-response pairs to a receiver, wherein the challenge of the one of the challenge response pairs is indicative of one or more locations in a firmware memory of the receiver, data in the one or more locations in the firmware memory of the receiver forming a key for use by the receiver to decrypt the encrypted control word.

16. The receiver according to claim 1, comprising:
a transmitter for transmitting, to a smartcard, a pair of the challenge and the first response to the challenge.

17. The receiver according to claim 1, comprising:
a transmitter for transmitting, to a smartcard, the challenge and a plurality of responses to the challenge, the plurality of responses associating with a plurality of receiver, respectively.

18. The smartcard according to claim 4, wherein the smartcard receives the encrypted challenge and the two or more encrypted responses for two or more receivers, and selects the response for encryption of the control word.

19. The receiver of claim 2, wherein the decrypter is configured to decrypt a second encrypted control word using the response to the further challenge to obtain a second control word.

20. The receiver of claim 19, wherein the descrambler is configured to descramble second scrambled content using the second control word to obtain second descrambled content.

21. The method according to claim 13, comprising decrypting a second encrypted control word using the response to the further challenge to obtain a second control word.

22. The method according to claim 21, comprising descrambling second scrambled content using the second control word to obtain second descrambled content.

* * * * *